United States Patent Office 2,807,623
Patented Sept. 24, 1957

2,807,623
CERTAIN ARYL MERCAPTO METHYL IMIDAZOLES

Leo R. Swett and Howard J. Glenn, Waukegan, Ill., assignors to Abbott Laboratories, Chicago, Ill., a corporation of Illinois No Drawing. Application August 17, 1955,
Serial No. 529,070

6 Claims. (Cl. 260—309)

This invention relates to novel and unusual chemical compositions which are noted for their physiological activity and to a method for making such compositions.

The new compositions of matter to which the invention pertains are those which may be characterized by the chemical formula

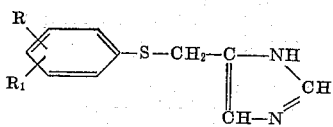

and the acid addition salts thereof, wherein R is selected from the group consisting of hydrogen, halogen, lower alkyl and lower alkoxy, and $R_1$ is from the group consisting of hydrogen and halogen. The term "halogen" is used in its ordinary sense as including fluorine, chlorine, bromine and iodine.

The term "lower alkyl," as used in the foregoing formula, is intended to include straight and branch chain radicals. The methyl, ethyl, propyl, and butyl radicals and their branched chain equivalent are included in this class. The term "lower alkoxy" includes the methoxy, ethoxy, propoxy, and butoxy radicals and branch chain equivalents.

The new compositions of this invention, which may be designated as 4(5)-arylmercaptomethylimidazoles, are prepared by reacting equimolar quantities of metallic sodium in alcohol, and a substituted or unsubstituted thiophenol. The mixture is stirred at room temperature for several hours and then cooled. A half-molar quantity of a 4(5)-halomethylimidazole hydrochloride is added to the reaction mixture with prolonged stirring at room temperature. Thereafter, the normal recovery procedure of filtering and solvent extraction is carried out. We made an unusual finding at this point that a technically pure salt will crystallize directly from a strongly acid solution upon standing. Thus, the expensive formation of the base is obviated and the 4(5)-arylmercaptomethylimidazole hydrochloride is obtained directly. The details of the method will be set forth in the hereinafter presented examples.

It will be apparent from a consideration of the nature of the reaction that one may select any of the simpler substituted thiophenols and react them with the 4(5)-halomethylimidazole hydrochloride in the manner just related. Since the substituents on the phenyl nucleus (other than the sulfur) do not enter into the reaction, the identity of said substituents is not critical in the reaction.

The novel compositions of this invention may be isolated and used as the free bases if desired. Ordinarily, however, it will be preferred to prepare the acid addition salt of the compound and administer it in this form. The acid addition salts are prepared in the usual manner by reacting the base with a mineral acid such as hydrochloric or sulfuric acid. The organic acid salts may also be prepared by a simple reaction between the base and an organic acid such as oxalic, citric or tartaric acid.

The 4(5)-arylmercaptomethylimidazoles are found to have exceptionally potent analgesic activity, and are utilized principally for this property.

The invention will be further illustrated by reference to the following examples which are not, however, to be construed as limiting the invention in any way.

EXAMPLE I

4(5)-o-bromophenylmercaptomethylimidazole hydrochloride

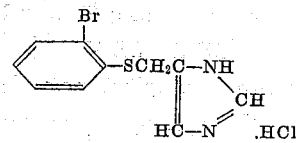

To a solution of 2.3 g. (0.1 mole) of sodium in 150 cc. of dry ethanol is added 18.9 g. (0.1 mole) of o-bromothiophenol. The solution is stirred for two and one-half hours and then cooled in an ice-hydrochloric acid bath. A solution of 7.65 g. (0.05 mole) of 4(5)-chloromethylimidazole hydrochloride in 50 cc. of ethanol is then added slowly over a period of about twenty-minutes with stirring and the mixture is then stirred an additional six hours at room temperature. After filtration to remove the sodium chloride, the alcohol solvent is removed under reduced pressure. To the resulting oil is added 25 cc. of water and 25 cc. of concentrated hydrochloric acid. The mixture is extracted with two 50 cc. portions of ether to remove the unreacted thiophenol. The aqueous phase on standing deposits 13.9 g. (91.5% of theory) of colorless crystalline 4(5)-o-bromophenylmercaptomethylimidazole hydrochloride, M. P. 152–154° C. Recrystallization from ethanol and ether gives 11.5 g. M. P. 155–156° C.

Analysis calculated for $C_{10}H_9BrN_2S \cdot HCl$: C, 39.30; H, 3.30; N, 9.17. Found: C, 39.49; H, 3.34; N, 9.11.

The base is made by dissolving the above salt in water and making the solution alkaline with sodium carbonate. The base precipitates and is filtered and washed with water. Recrystallization from dilute ethanol gives 4(5)-o-bromophenylmercaptomethylimidazole, M. P. 118–119° C.

EXAMPLE II

4(5)-p-methoxyphenylmercaptomethylimidazole hydrochloride

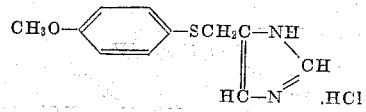

By the procedure given in Example I and using 14.0 g. (0.1 mole) of p-methoxythiophenol, crystalline 4(5)-p-methoxyphenylmercaptomethylimidazole hydrochloride, M. P. 123–124° C., is secured in a yield of 85%.

Analysis calculated for $C_{11}H_{12}N_2OS \cdot HCl$: C, 51.46; H, 5.10; N, 10.91. Found: C, 51.61; H, 5.37; N, 11.08.

EXAMPLE III

4(5) - p - chlorophenylmercaptomethylimidazole hydrochloride

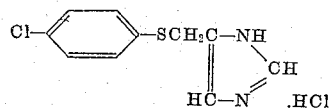

By the procedure given in Example I and using 14.5 g. (0.1 mole) of p-chlorothiophenol, crystalline 4(5)-p-chlorophenylmercaptomethylimidazole hydrochloride, M. P. 176–177° C., is secured in a yield of 93%.

Analysis calculated for $C_{10}H_9ClN_2S \cdot HCl$: C, 45.99; H, 3.86; N, 10.73. Found: C, 46.05; H, 4.16; N, 10.66.

EXAMPLE IV

*4(5)-p-iodophenylmercaptomethylimidazole hydrochloride*

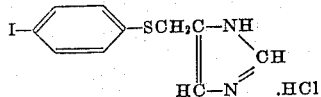

By the procedure given in Example I and using 23.6 g. (0.1 mole) of p-iodothiophenol, crystalline 4(5)-p-iodophenylmercaptomethylimidazole hydrochloride, M. P. 200–201° C., is obtained in 82% yield.

Analysis calculated for $C_{10}H_9IN_2S \cdot HCl$: C, 34.15; H, 2.87; N, 7.97. Found: C, 34.55; H, 2.92; N, 7.53.

EXAMPLE V

*4(5)-phenylmercaptomethylimidazole hydrochloride*

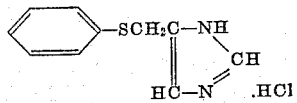

By the procedure given in Example I and using 11.0 g. (0.1 mole) of thiophenol, crystalline 4(5)-phenylmercaptomethylimidazole hydrochloride, M. P. 121–122° C., is obtained in a 90% yield.

Analysis calculated for $C_{10}H_{10}N_2S \cdot HCl$: C, 52.97; H, 4.89; N, 12.36. Found: C, 53.07; H, 5.05; N, 12.15.

EXAMPLE VI

*4(5) - 2 - methyl - 5 - chlorophenylmercaptomethylimidazole hydrochloride*

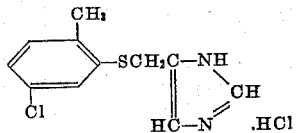

By the procedure given in Example I and using 15.8 g. (0.1 mole) of 2-methyl-5-chlorothiophenol, crystalline 4(5)-2-methyl-5-chlorophenylmercaptomethylimidazole hydrochloride, M. P. 143–145° C., is obtained in a yield of 71%.

Analysis calculated for $C_{11}H_{11}ClN_2S \cdot HCl$: C, 48.01; H, 4.40; N, 10.18. Found: C, 48.06; H, 4.43; N, 10.48.

EXAMPLE VII

*4(5) - 2,5 - dichlorophenylmercaptomethylimidazole hydrochloride*

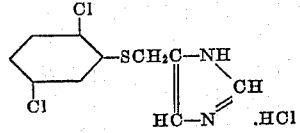

By the procedure given in Example I and using 17.9 g. (0.1 mole) of 2,5 - dichlorothiophenol, crystalline 4(5) - 2,5 - dichlorophenylmercaptomethylimidazole hydrochloride, M. P. 184–186° C., is obtained in a 75% yield.

Analysis calculated for $C_{10}H_8Cl_2N_2S \cdot HCl$: C, 40.63; H, 3.07; N, 9.48. Found: C, 40.89; H, 3.08; N, 9.38.

Others may practice the invention in any additional way which may be suggested to one skilled in the art. It is intended that such practice be included within the invention, provided, however, that such practice falls within the scope of the appended claims.

We claim:

1. A new composition of matter from the group consisting of the base

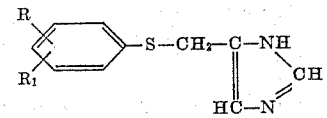

and acid addition salts thereof, wherein R is selected from the group consisting of hydrogen, halogen, lower alkyl and lower alkoxy and R₁ is selected from the group consisting of hydrogen and halogen.

2. An acid addition salt of a new composition of matter having the formula

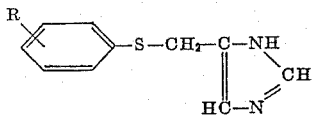

wherein R is halogen.

3. An acid addition salt of a new composition of matter having the formula

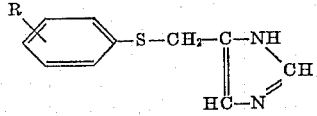

wherein R is lower alkyl.

4. An acid addition salt of 4(5) - phenylmercaptomethylimidazole.

5. 4(5) - phenylmercaptomethylimidazole hydrochloride.

6. 4(5) - o-bromophenylmercaptomethylimidazole hydrochloride.

References Cited in the file of this patent

UNITED STATES PATENTS 2,714,597   Schock et al. _____ Aug. 2, 1955

OTHER REFERENCES

Turner et al.: J. Am. Chem. Soc., vol. 71, pp. 2801–3 (1949).